(No Model.)
O. H. JEWELL.
STRAINER FOR SUCTION PIPES OF PUMPS.
No. 419,606. Patented Jan. 14, 1890.
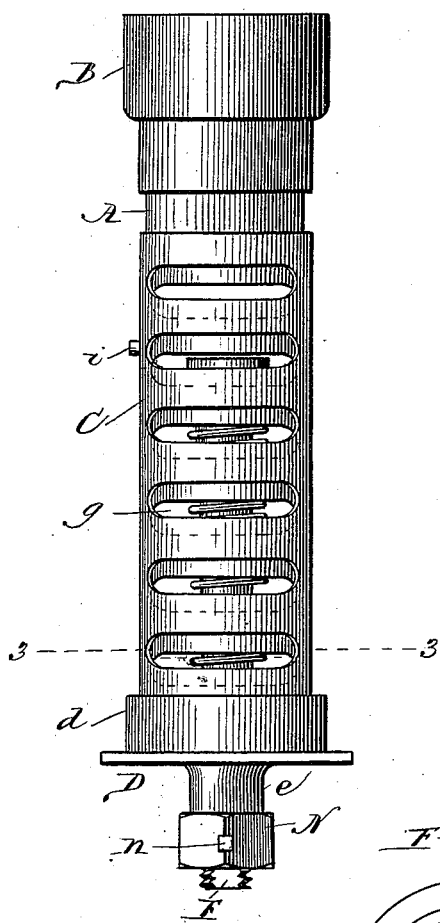
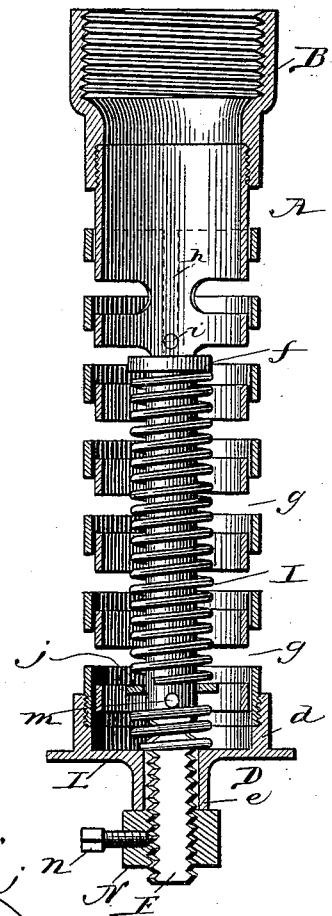
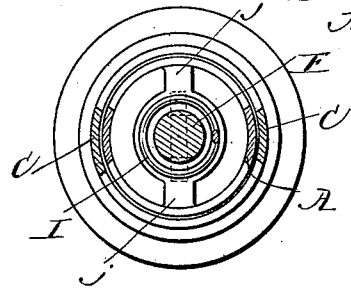
Witnesses
W. Rossiter
Otto Duebker
Inventor
Omar H. Jewell
By Wm. H. Lotz
Atty.

UNITED STATES PATENT OFFICE.

OMAR H. JEWELL, OF CHICAGO, ILLINOIS, ASSIGNOR TO IRA H. JEWELL AND WILLIAM M. JEWELL, BOTH OF SAME PLACE.

STRAINER FOR SUCTION-PIPES OF PUMPS.

SPECIFICATION forming part of Letters Patent No. 419,606, dated January 14, 1890.

Application filed July 23, 1889. Serial No. 318,466. (No model.)

*To all whom it may concern:*

Be it known that I, OMAR H. JEWELL, a citizen of the United States of America, residing at Chicago, in the county of Cook and State of Illinois, have invented certain new and useful Improvements in Strainers for Suction-Pipes of Pumps, of which the following is a specification, reference being had therein to the accompanying drawings.

This invention relates to improvements in strainers for suction-pipes of pumps, siphons, &c., and more particularly to improvements in the strainer described in Letters Patent No. 408,487, granted to me on August 6, 1889, it having for its object to provide a strainer having a series of narrow openings that will prevent solid matter from entering the suction-pipe, the width of which can be readily adjusted to more or less, and which can be readily cleaned by expanding and contracting such openings either by hand or by a reverse stream of water; and with these objects in view my invention consists of the novel devices and combinations of devices hereinafter described and specifically claimed.

In the accompanying drawings, Figure 1 represents an elevation, and Fig. 2 a vertical section, through the center line of the strainer; and Fig. 3, a horizontal section on line 3 3 in Fig. 1.

Corresponding letters of reference in the several figures of the drawings designate like parts.

A denotes a cylindrical tube screwed with its upper end into a nozzle B, providing a screw-threaded socket for connection with the lower end of the suction-pipe of a pump or siphon.

C is another cylindrical tube of sufficiently larger diameter for tube A to fit snugly therein in a manner that both tubes will telescope with each other. This tube C is screwed with its lower end into the annular screw-threaded flange $d$ of a cap D, provided at its bottom with a central boss $e$, having a flat hole for guiding the flattened screw-threaded end of a bolt F.

Both tubes A and C are circumferentially slotted from diametrically-opposite sides to provide a series of segmental openings $g$ of uniform width and equal distance apart, the remaining metal between each two openings longitudinally being about the same width as the openings. Between these openings $g$ the tube C has in its upper end a vertical slot $h$, engaging a stud $i$, fixed upon tube A for guiding the tubes A and C while telescoping, to hold the openings $g$ of both tubes relatively in line with each other.

Near its lower end the tube A is provided with a rigid bridge-plate $j$, through a central hole in which the bolt F is projected, and between its head $f$ and said bridge-plate the bolt F is surrounded by a spiral spring I, and below said bridge-plate $j$ the bolt F is pierced by a cross-pin $m$, which will provide a stop or shoulder for limiting its vertical movement. Upon the projecting lower screw-threaded end of bolt F is fitted a nut N, provided with a set-screw $n$ for locking it after adjustment, and between cross-pin $m$ and cap D is placed around bolt F another spiral spring L, which by drawing the bolt F by turning nut N will be contracted. This spring L, however, is not essential and may be left out. By releasing the nut N the cap D and tube C may be lowered until the openings of tubes A and C are in line with each other, and by turning the nut in the reverse direction the cap D and tube C are raised for reducing the inlet through openings $g$ to any desired degree, and after thus adjusting by tightening the set-screw $n$ the parts are rigidly held in their position. By grasping the cap D and pulling it downward the spring I will yield for tube C to telescope upon tube A about three times the width of a slot $g$, whereby weeds, straw, or other solid matter obstructing the inlet-openings will be removed, or if projecting into these openings will be sheared off by the edges of the slots $g$ of both tubes pushing past each other, or, instead of grasping cap D and pulling it downward, the same may be caused by a reverse operation of the pump, when the reverse current of the water will expand the strainer and will wash out all impurities that may have collected in and around it.

What I claim is—

1. A strainer for the suction-pipe of a pump, principally consisting of two tubes telescoping with each other and both provided with circumferential slots of equal size and distance apart, said tubes being arranged for relative longitudinal adjustment to increase or decrease the width of the water-inlets, substantially as set forth.

2. A strainer for the suction-pipe of a pump, consisting of tube A, rigidly secured to the end of the suction-pipe, and of tube C, telescoping with tube A and being closed on bottom by a cap D, both tubes being provided with a series of segmental openings $g$ and being longitudinally adjustable by a bolt F and nut N for increasing or decreasing the width of the water-inlets, substantially as set forth.

3. A strainer for the suction-pipe of a pump, consisting of tube A, provided with a coupling for rigidly securing the same with the end of the suction-pipe, and of tube C, sleeved upon tube A to telescope therewith and closed on bottom by a cap D, both tubes A and C provided with segmental slots $g$, and the tube A provided with a bridge-plate $j$, and of a bolt F, connected with such bridge-plate, projected through cap D and provided with a nut N for extending or contracting the tubes, and thereby adjusting the relative positions of openings $g$, substantially as set forth.

4. A strainer for the suction-pipe of a pump, consisting of tube A, provided with a coupling for rigidly securing the same to the end of the suction-pipe, and of tube C, sleeved upon tube A to telescope therewith and closed on bottom by a cap D, both tubes A and C provided with segmental slots $g$, and the tube A provided with a bridge-plate $j$, of a bolt F, passed through said bridge-plate and through cap D and provided with a nut N; and of a spiral spring placed over the bolt F, between its head $f$ and the bridge-plate, all substantially as set forth.

In testimony whereof I affix my signature in presence of two witnesses.

OMAR H. JEWELL.

Witnesses:
WM. H. LOTZ,
OTTO LUEBKERT.